United States Patent
McFarland

[11] 3,826,145
[45] July 30, 1974

[54] ELECTRICAL ATAXIAMETER

[76] Inventor: Keith H. McFarland, 13661 La Palma Rd., Los Altos Hills, Calif. 94022

[22] Filed: Mar. 1, 1973

[21] Appl. No.: 336,914

[52] U.S. Cl. ............... 73/432 R, 128/2 N, 128/2 S
[51] Int. Cl. ........................................... A61b 5/00
[58] Field of Search...... 73/432 R, 172, 141 A, 133; 128/2 N, 2 S

[56] References Cited
UNITED STATES PATENTS

| | | | |
|---|---|---|---|
| 2,544,738 | 3/1951 | Tint | 73/133 |
| 2,653,475 | 9/1953 | Kraus | 73/172 |
| 2,681,566 | 6/1954 | Ruge | 73/141 R |
| 2,688,873 | 9/1954 | Burris-Meyer | 73/172 |
| 3,504,540 | 4/1970 | Pradko et al. | 73/432 |
| 3,712,294 | 1/1973 | Muller | 128/2 N |

FOREIGN PATENTS OR APPLICATIONS
1,002,866   9/1965   Great Britain ....................... 128/25

Primary Examiner—S. Clement Swisher
Attorney, Agent, or Firm—Alfons Puishes

[57] ABSTRACT

A device and accompanying instrumentation measures involuntary tremor and unsteadiness of the human body when standing in an erect position upon the device. Novel construction and combination produces highly accurate readings in spite of difference in weights and weight distribution of the subject. Correlated data makes possible studies revealing learning potentials, brain damage, neuro-muscular responses, effect of diet and drugs, and aids in evaluation of the treatment of related syndromes.

6 Claims, 11 Drawing Figures

PATENTED JUL 30 1974

ELECTRICAL ATAXIAMETER

BACKGROUND OF THE INVENTION

Several methods of measuring static balance ability are described in the literature. The simplest and most straight-forward way to assess equilibrium control is to measure the time of maintaining a certain posture without moving the feet or taking resort to support. Although apparently somewhat reliable in older subjects, the relatively short timed pass/fail scores are of questionable reliability in children of more tender ages, especially at the age of about six. The latter approach has additional disadvantages of measuring the incidence of failure instead of assessing the patterns of performance.

More sophisticated methods are based on the use of devices called ataxiameters or statometers. The principle of these methods consists in recording body sway, transmitted by means of a stylus attached to the head, hips, or back, or mounted to footplates. An unusual machine was constructed by Miles (1922) which used a headpiece attached to four mechanical counters, one for each direction of sway, that is, forward, backward, left, and right. A more complex device combining a mechanical and electronic output system was developed by Akerblom (1948). The foregoing devices were used primarily in laboratory experiments with adults, and were not adapted for testing of children. Applicant is not now aware of any patents on devices or systems of this type.

All devices and methods heretofore used for this purpose were subject to many variables and other objections. There were caused by variations in the physical properties of the subjects to be tested and difficulties in obtaining accurate readings, especially on children as pointed out above. It has always been extremely difficult to separate voluntary from involuntary body movements and hence the data obtained were usually inconclusive.

SUMMARY OF THE INVENTION

I have discovered that by use of my invention I am able to overcome the objections to previous devices and produce really accurate, reliable, and conclusive data. My invention opens up a whole new field of medical research as set forth and explained more fully below.

My invention comprises an ataxiameter which may be defined as an instrument for the measurement of involuntary tremor and unsteadiness of the whole body in an erect position. The invention is a compact, rugged mechanical-electrical force transducer and a combination of same, for the purpose of monitoring the degree of neuro-muscular coordination.

The accurate measurement of this parameter permits the study and evaluation of body motor responses which correlate with a wide variety of skills ranging from ability to excel in physical sports, and driving and piloting proficiency, to the ability to read and accomplish many other psycho-motor activities.

My invention may be used in the study of pathology of the inner ear as it effects the body's ability to balance and the device enables the study of brain damage and neuro-muscular aberration, and the effects of treatment of same.

Finally, my invention permits the determination of the qualitative and quantitative effects of diet, drugs (including alcohol) and environmental factors on neuro-muscular responses.

More specifically, my invention comprises a force measuring ataxiameter and still more specifically a device for measuring simultaneously the various dynamic forces exerted through the feet by the body when standing erect.

My invention provides a more perfect and simplified means of measuring the forces which are a product of the involuntary neuro-muscular coordination which are an indication of the body's motor efficiency, which are exerted at the ball and the heel parts of each foot.

DESCRIPTION OF THE DRAWINGS

FIG. 1B is a cut-away top view of FIG. 1 with foot plates removed showing especially the novel central member or force transducer of my invention.

DESCRIPTION OF PREFERRED EMBODIMENTS

Figure 1:
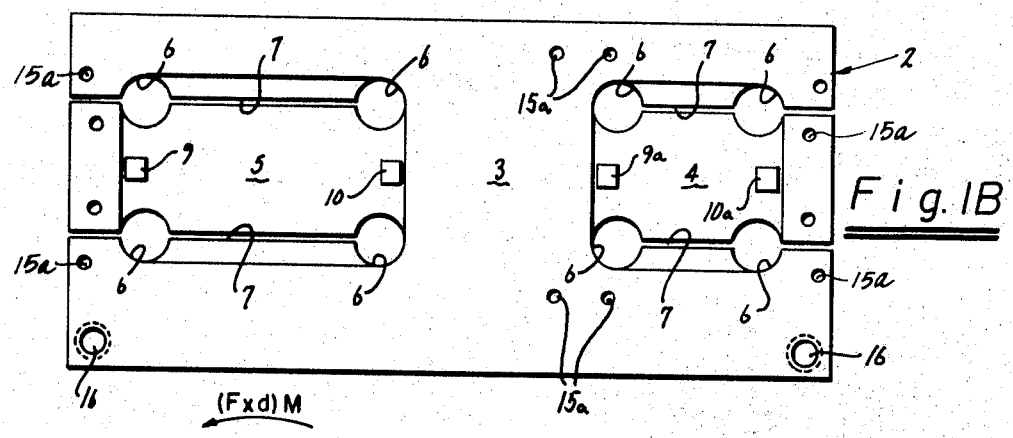
FIG. 1 is an elevation, partly in section, of an embodiment of a single base ataxiamater of the invention.
Figure 1:
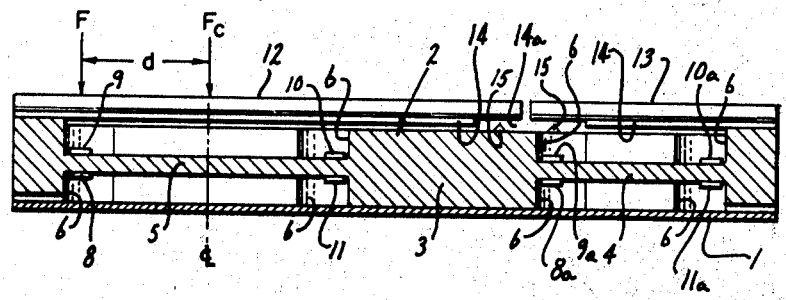
Figure 1A:
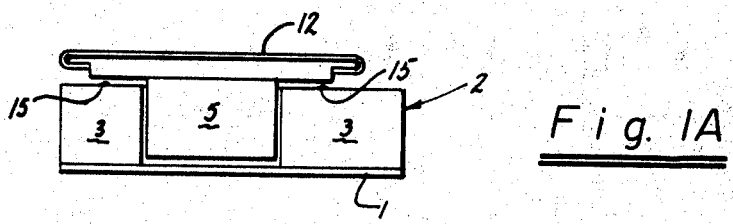
FIG. 1A is a left end view of FIG. 1.
Figure 2:
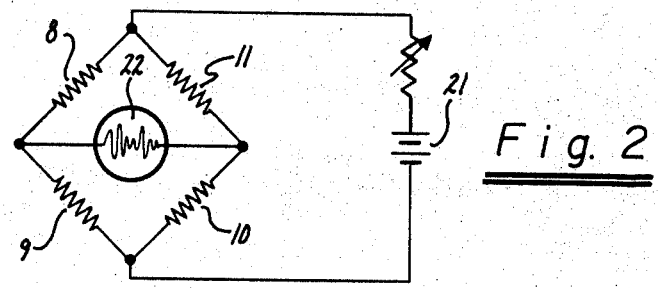
FIG. 2 is an electrical wiring diagram in schematic showing interconnection of the power source, strain gauges and output instrumentation of my invention.

Referring now to the drawings and more particularly to FIG. 1 and FIG. 2, there is seen first a pad 1 which serves for support of my device. Positioned upon pad 1 is my basic force transducer element. The latter comprises a central fixed section 3, a rear cantilever section 4 and a front or forward cantilever section 5. The former is adapted to receive forces from the heel, whereas the latter is adapted to receive forces from the front or ball of the foot of the person being tested. Section 3 may be split vertically to accommodate a greater range of foot sizes.

Components or elements 6 represent relieving holes which act in combination with slots 7 to permit proper functioning of my device as explained more fully below.

Strain gauges 8, 8a, 9, 9a, 10, 10a, 11, and 11a are positioned on cantilever sections 4 and 5 as shown. These may be of any construction such as those in which the resistance to electrical flow varies in relation to the strain induced by the force or pressure applied and is thus capable of measurement by suitable instruments as is well known to those skilled in the art.

An adjustable plate 12 is adapted to receive the forward or ball part of the person's foot is positioned over the forward part of my device and a corresponding heel plate 13 adapted to receive the heel of a person is positioned at the rear end. These may be varied to accommodate different foot sizes. I utilize a transfer plate 14 between footplate 12 and footplate 13 and my basic transducer 2 and allow air space or clearance gap 14a, the function of which will become evident from my later description. Adjusting screw stops 15 and their engaging stop holes 15a are likewise located in this area for the purpose of preventing damage from overload.

Levelling screws 16 are provided for convenience in maintaining a level conditionor for producing a desired tilt of my device when in use.

Referring now more particularly to FIG. 2, there is seen a power source 21 and a means of variation 21a which may be of any convenient nature connecting to my strain gauges 8, 9, 10, and 11 described above, which are interconnected in a circuit such as a wheatstone bridge. Across opposite terminals of my bridge circuit I insert a recording instrument 22, which may be an oscillograph or other instrument for use in measuring the current flows through my circuitry as described more fully below. The level of the power source 21 or the sensitivity of the measuring instrument 22 may be adjustable to compensate for differing body weights, thereby making ataxiameter studies more independent of the variations in weight among subjects. Of course, my device may be used for measuring weight where desired, as indicated below.

Figure 6A:
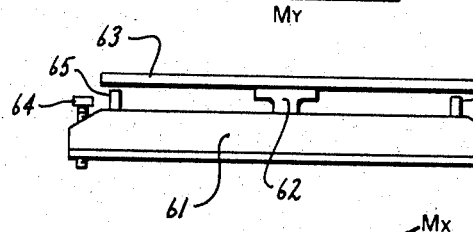
FIG. 6A is a side elevation of an alternate embodiment of my invention.
Figure 6B:
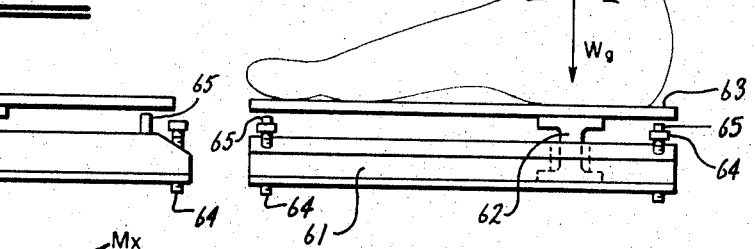
FIG. 6B is the embodiment of FIG. 6A showing a foot and partial leg member superimposed thereon.
Figure 7:
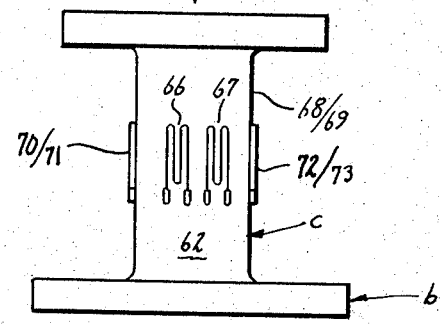
FIG. 7 is an enlarged elevation of the vertical column member 62 of FIG. 6A and FIG. 6B showing the location of strain gauges.
Figure 8:
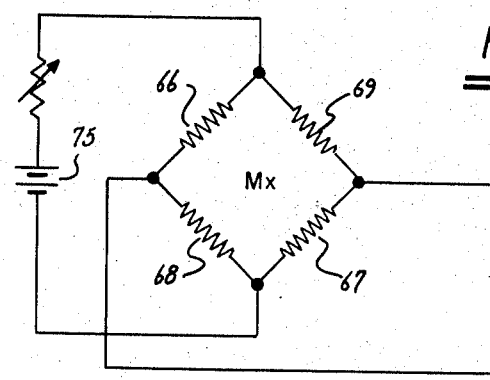
FIG. 8 is an electrical wiring diagram in schematic showing interconnection of the electrical elements for the alternate embodiments of FIG. 6 and FIG. 7.

Referring now more particularly to FIGS. 6, 7, and 8, there is seen an alternate embodiment of my invention which essentially accomplishes similar results and may be used favorably under certain conditions as set forth more fully below.

In this embodiment I employ a base plate 61 upon which is positioned a member which may be described as a short column 62. Footplate 63 is positioned upon member 62. Levelling screws 64 are utilized to maintain my device in a level condition when in use, similar to the practice with the embodiment previously described. Stops 65 are positioned between base plate 61 and footplate 63.

Strain gauges similar to those described for my previous embodiment, namely members 66, 67, 68, 69, 70, 71, 72, and 73, are positioned around the vertical portion of member 62 as shown.

Referring now more particularly to FIG. 6B there is shown a human foot and partial leg member 74 positioned on my device for test purposes, as will be described later.

Referring now to FIG. 8, there is seen a wiring diagram which is essentially similar to that shown in FIG. 2 but adapted for this particular embodiment. A power source 75 supplies a Wheatstone bridge type of circuitry connecting strain gauge elements 66, 67, 68, and 69 located on opposite sides of the vertical section of member 62. A similar circuit supplies strain gauge element 70, 71, 72, and 73 located on the other two vertical sides of member 62. The output from this circuitry in each case goes to a suitable recorder which may be an oscillograph or any other type of device known to those skilled in the art of instrumentation.

Figure 3:
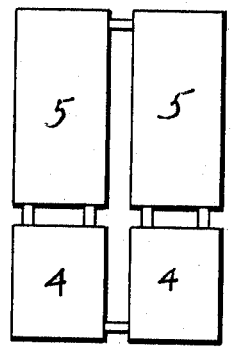
FIG. 3 shows diagramatically various position arrangements of dual base ataxiameters as used for special test purposes.
Figure 3:
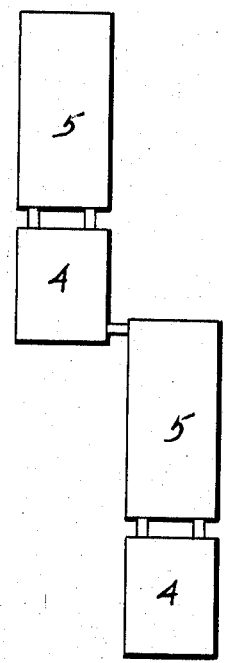
Figure 3:
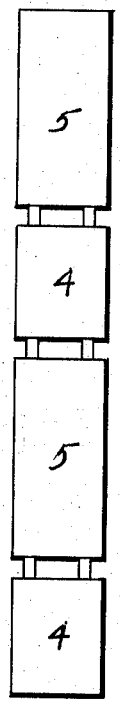

I may utilize various relative physical arrangements of the foot supports or platforms of my invention depending upon the results desired. Thus, in FIG. 3 I show arrangements adapted for my first embodiment of FIG. 1 in which members 4 and 5 are shown side by side, offset one from the other, or one completely in front of the other. The first is the common stance or posture of the subject being tested, the second is the modified Romberg position and the third is the regular Romberg position.

When a subject is positioned with its feet on top of my device in either of the embodiments or positions shown, the deflections of my structural elements are transmitted to the properly positioned strain gauges as described above which in turn transmit electrical signals through circuitry and to the indicating and recording instruments. The net result is that the resultant signals are proportioned to the forces and practically independent of the subject's position on the device. This renders my device unusually well suited to the accurate measurements of body tremors and unsteadiness and their correlation for purpose of the studies described above.

Reference should be had again to FIG. 1 showing the location of the strain gauges, and to FIG. 2 showing the bridge wiring to achieve insensitivity to force position. In FIG. 1 any force $F$ on the forward foot plate can be resolved into $F_c$, (the force at the center) $= F$ plus a moment $M = F \times d$. By theory the moment $M$ is constant along the beam and produces equal and consequently cancelling strains in the gauges 8 and 11 and also in gauges 9 and 10. In the Wheatstone bridge, gauges in adjacent legs having identical strain produce cancelling effects and therefore the moment M and the force position are not measured. FIG. 2 shows how the gauges are connected to accomplish this purpose as described more fully above.

Similar results are obtained in the embodiment shown in FIG. 6A, FIG. 6B and FIG. 7 by the measurements of moments instead of forces. This will be evident from a study of FIG. 8 as related to the position of the strain gauges shown in FIG. 7.

Figure 4:
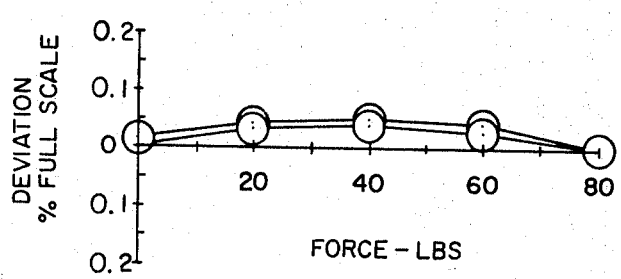
FIG. 4 is a calibration test curve showing the precision of my invention as related to variations in force or load applied.
Figure 5:
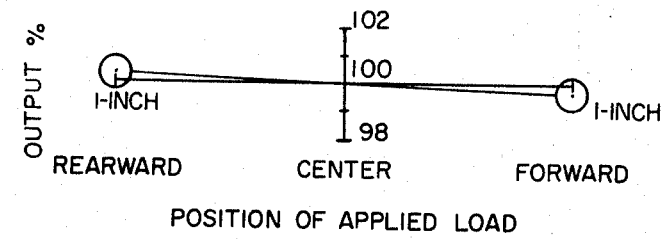
FIG. 5 is a calibration test curve showing the precision of my invention as related to the variations in position of applied load.

In FIG. 4 I show the full scale deviation in readings plotted against variations of force in pounds applied to my device. In FIG. 5 I show the output in percentage plotted against variation of positions in applied load.

These plots are related to the application and operation of my device and show its high degree of accuracy and precision despite variations in the physical characteristics such as weight and positions of subjects being tested. This is a very important feature of my invention as should now be evident.

It should be evident now how either of the basic embodiments disclosed herein may be used to measure the weight alone of the subject where this is desired as indicated above. This might be the case where the weight of the subject might be a factor in correlating the results of the other readings taken as described above depending upon the nature of the study being conducted.

This would involve the simple expedient of switching the connections of the strain gauges and connecting to a suitable calibrated instrument. The latter would then show the actual weight since this is a function of the deflection of the structural members and hence the amount of current flowing through the strain gauges.

Actual tests of my invention on scores of school children have shown remarkable correlation between reading skills and amplitude and characteristics of the signals from the ataxiameter.

Other tests of my invention have shown marked changes in characteristics and amplitude of the records from the ataxiameter accompanying the imbibing of increasing amounts of alcohol, thereby suggesting its use as an aid to sobriety tests.

Still other tests have shown the usefulness of my invention in producing measurements used for studies of various physical and mental characteristics of the human body under a variety of conditions and for a number of purposes as set forth in the Summary.

I claim:

1. An ataxiameter comprising:
a pair of horizontal cantilever beams suspended from a common central support in horizontal alignment with each other;
said cantilever beams being characterized by the complete absence of restraining means at the free ends thereof;
a first means for positioning the heel portion of the foot of a human upon the first of said beams;
a second means for positioning the ball portion of a foot of a human upon the second of said beams, said first means and said second means being mechanically independent of each other;
electrical strain gauges positioned upon the surfaces of said beams at their fixed and at their free ends respectively;
means for interconnecting said strain gauges;
an electrical recording device;
means for connecting said strain gauges to said recording device.

2. The device of claim 1 in which said means for interconnecting said strain gauges comprises a Wheatstone bridge network;
an electrical recording instrument connected across the legs of said bridge network;
an electrical power supply connected to said network.

3. The device of claim 2 including means for varying the intensity of said power supply.

4. An ataxiameter comprising:
a central fixed section;
a rear horizontal cantilever section having a fixed end and a free end,
said fixed end being positioned on one side of said central fixed section;
a forward horizontal cantilever section having a fixed end and a free end,
said fixed end being positioned on the opposite side of said central fixed section;
a first plate positioned above said rear section in contact with said free end of said section and adapted to receive the heel part of a human foot;
a second plate positioned above said forward section in contact with said free end of said section and adapted to receive the ball part of a human foot;
electrical strain gauges positioned upon opposite ends of said cantilever sections so as to be responsive to strains produced by the deflection of said sections;
an electrical recording device;
means for connecting said strain gauges to said recording device.

5. The device of claim 4 in which said means for interconnecting said strain gauges comprises a Wheatstone bridge network;
an electrical recording instrument connected across the legs of said bridge network;
an electrical power supply connected to said network.

6. The device of claim 5 including means for varying the intensity of said power supply.

* * * * *